(12) United States Patent
Khanna et al.

(10) Patent No.: US 8,580,141 B2
(45) Date of Patent: Nov. 12, 2013

(54) STEARIC ACID-TREATED CALCIUM CARBONATE COMPOSITIONS HAVING LOW OR NO DETECTABLE FREE STEARIC ACID AND RELATED METHODS

(75) Inventors: Yash Khanna, Roswell, GA (US); David Taylor, Marietta, GA (US); David Anstine, Canton, GA (US); Christopher Paynter, Atlanta, GA (US)

(73) Assignee: Imerys Pigments, Inc., Roswell, GA (US)

( * ) Notice: Subject to any disclaimer, the term of this patent is extended or adjusted under 35 U.S.C. 154(b) by 229 days.

(21) Appl. No.: 13/063,498

(22) PCT Filed: Sep. 4, 2009

(86) PCT No.: PCT/US2009/056055
§ 371 (c)(1),
(2), (4) Date: Mar. 11, 2011

(87) PCT Pub. No.: WO2010/030579
PCT Pub. Date: Mar. 18, 2010

(65) Prior Publication Data
US 2011/0159290 A1 Jun. 30, 2011

Related U.S. Application Data

(60) Provisional application No. 61/096,613, filed on Sep. 12, 2008.

(51) Int. Cl.
*C01F 11/18* (2006.01)
*B05D 5/00* (2006.01)
*C09K 3/00* (2006.01)

(52) U.S. Cl.
USPC .................. 252/183.13; 427/207.1; 427/215; 427/213.3; 427/220; 428/403; 523/210; 524/425; 524/318; 106/464; 106/465; 423/430

(58) Field of Classification Search
USPC ............... 252/183.13; 427/207.1, 215, 213.3, 427/220; 428/403; 523/210; 524/425, 318; 106/464, 465; 423/430
See application file for complete search history.

(56) References Cited

U.S. PATENT DOCUMENTS 2,822,331 A * 2/1958 Dilworth et al. .............. 508/465
2,841,504 A * 7/1958 Liggett ......................... 106/465
(Continued)

FOREIGN PATENT DOCUMENTS

EP   1 452 489 A1   9/2004
GB   863864         3/1961
(Continued)

OTHER PUBLICATIONS

Thomson Scientific, London, GB, XP-002669926—New Building Matls. Inst., Jun. 5, 1974.
(Continued)

*Primary Examiner* — Joseph D Anthony
(74) *Attorney, Agent, or Firm* — Finnegan, Henderson, Farabow, Garrett & Dunner, L.L.P.

(57) ABSTRACT

A method for treating calcium carbonate includes combining calcium carbonate with an amount of stearic acid and an amount of water to form a mixture, the amount of water being at least about 0.1% by weight relative to the total weight. The method further includes blending the mixture to form a stearic acid-treated calcium carbonate composition.

14 Claims, 5 Drawing Sheets

(56) References Cited

U.S. PATENT DOCUMENTS

| | | | |
|---|---|---|---|
| 2,927,091 A * | 3/1960 | Liggett | 524/300 |
| 4,705,810 A * | 11/1987 | Millet et al. | 521/86 |
| 4,753,679 A * | 6/1988 | Damiano et al. | 106/664 |
| 6,342,100 B1 | 1/2002 | Nover et al. | |
| 2004/0147636 A1 | 7/2004 | Calhoun et al. | |
| 2011/0159290 A1 * | 6/2011 | Khanna et al. | 428/403 |

FOREIGN PATENT DOCUMENTS

| | | |
|---|---|---|
| WO | WO 03/037796 A1 | 5/2003 |
| WO | WO 2006/060368 A2 | 6/2006 |
| WO | WO 2010/030579 A1 | 3/2010 |

OTHER PUBLICATIONS

Extended European Search Report issued Mar. 2, 2012, in EP Application No. EP 09813486.9.

International Search Report and Written Opinion issued Nov. 18, 2009, in International Application No. PCT/US2009/056055 filed Sep. 4, 2009.

Yuexin, Han; Jinghua, Chen; Zehong, Wang; and Shuhui, Li, "Study on Surface Modification of Nanometer Calcium Carbonate", Mining and Metallurgy, 2003, vol. 12. No. 1.

Yishun, Cui, "Study on the surface modification technique of calcium carbonate", Sichuan Chemical Industry, 2004, vol. 7, No. 2.

English Translation of Office Action issued in related Chinese Application No. 200980144956.6, dated Feb. 1, 2013.

* cited by examiner

STEARIC ACID-TREATED CALCIUM CARBONATE COMPOSITIONS HAVING LOW OR NO DETECTABLE FREE STEARIC ACID AND RELATED METHODS

This application is a U.S. national stage entry under 35 U.S.C. §371 from PCT International Application No. PCT/US2009/056055, filed Sep. 4, 2009, and claims priority to and the benefit of the filing date of U.S. Provisional Application No. 61/096,613, filed Sep. 12, 2008, the subject matter of both of which are incorporated herein by reference.

DESCRIPTION

1. Field of the Disclosure

Disclosed herein are methods for treating calcium carbonate with stearic acid to produce stearic acid-treated calcium carbonate compositions having low or no free stearic acid. Also disclosed herein are stearic acid-treated calcium carbonate compositions having low or no detectable free stearic acid.

2. Background of the Disclosure

The present disclosure generally relates to methods for treating calcium carbonate with stearic acid and stearic acid-treated calcium carbonate compositions.

Calcium carbonate ($CaCO_3$) may be considered among the most widely used fillers/extenders for the polymer industry. It may be obtained either by grinding naturally occurring calcium carbonate mineral or by carbonation of a calcium hydroxide solution. Due to its hydrophilic nature and having a high surface energy of 200 $mJ/m^2$, it may be incompatible with the most common hydrophobic polymers, for example, such as polyethylene (PE) and polypropylene (PP), which may exhibit a low surface energy of about 35 $mJ/m^2$. While larger particles having a median particle size, for example, ($d_{50}$)≥3 μm, can be incorporated into polymers, the smaller particles, by virtue of enhanced particle-particle interactions, tend to agglomerate, which may lead to dispersion and/or performance problems. Moreover, moisture pick-up by calcium carbonate may pose additional problems during handling and processing. As a result, it may be desirable to render the calcium carbonate surface hydrophobic via treatment with surface modifiers, the most common being stearic acid (SA). It may be desired that a minimum amount of coating be applied to the calcium carbonate, in particular, an amount that just covers the surface of the calcium carbonate particle. This minimum amount, highly dependent on the surface area of the mineral, is sometimes referred to as "monolayer concentration." In the case of a calcium carbonate-SA system, a monolayer concentration of SA may be added in order to reduce the unreacted/free SA in the final product. However, practically all conventional calcium carbonate-SA coated grades have some unreacted/free SA, partly due to an incomplete reaction, and/or partly due to less than ideal mixing conditions and/or the addition of excess SA to the calcium carbonate. Conventional methods of treating calcium carbonate with SA may therefore often result in residual, unreacted, or free SA in the bulk and/or on the surface of the treated calcium carbonate.

Figure 1:
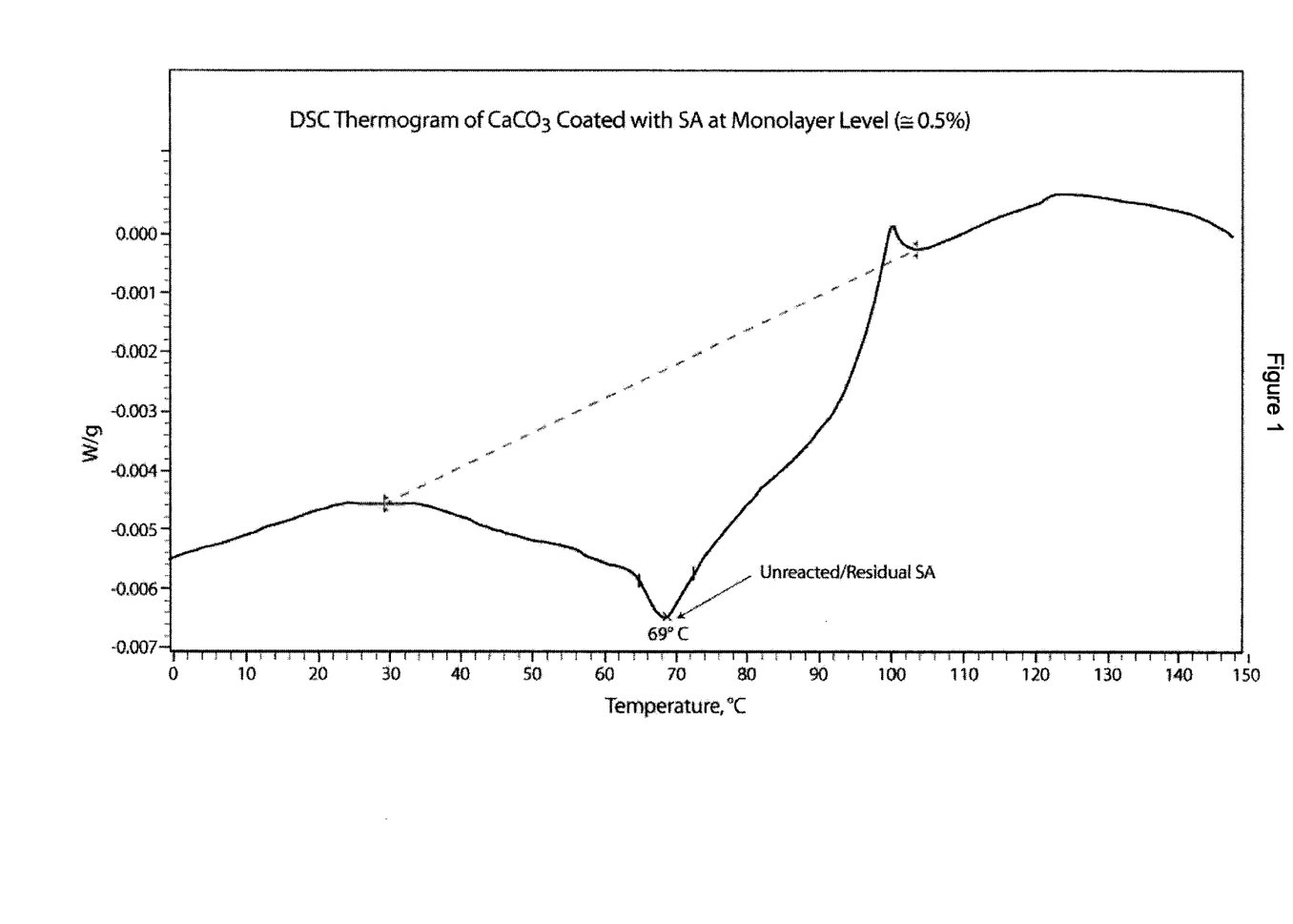
FIG. 1 depicts a DSC thermogram of calcium carbonate coated with stearic acid at monolayer concentration.
Figure 2:
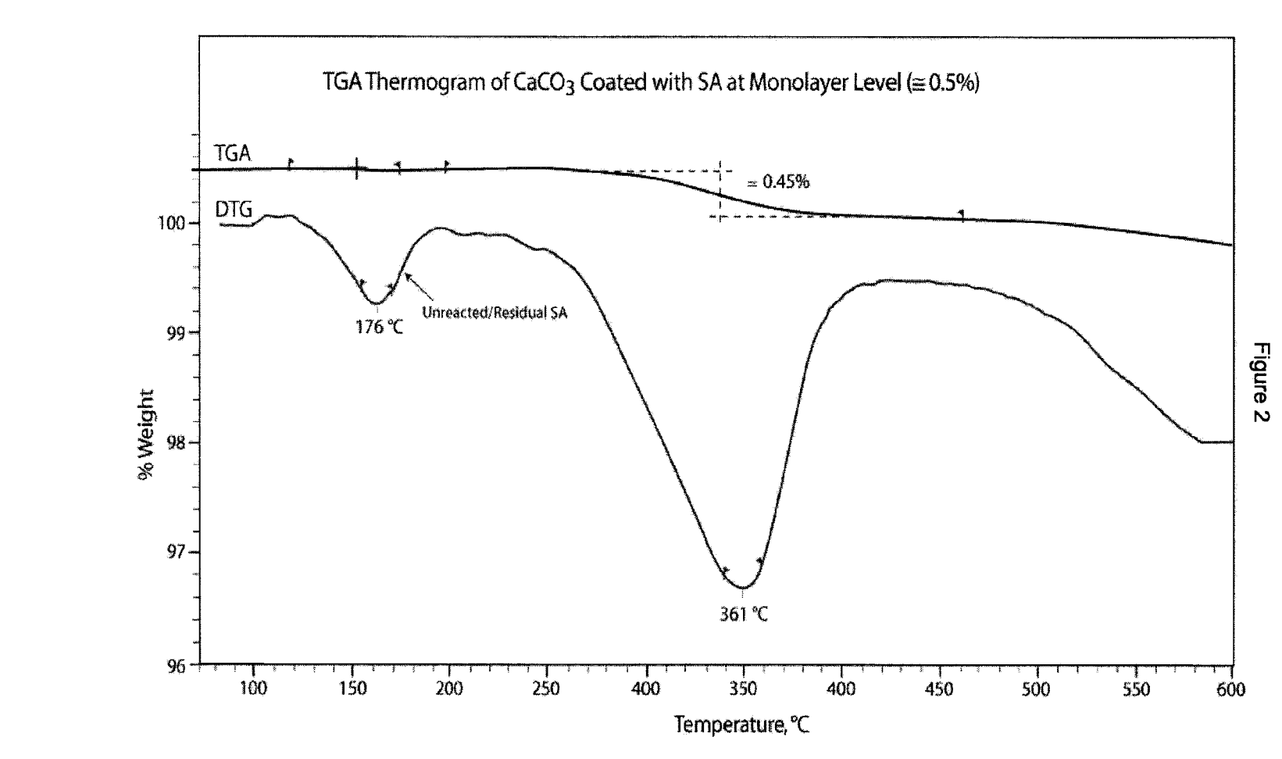
FIG. 2 depicts a TGA thermogram of calcium carbonate coated with stearic acid at monolayer concentration.

Using methods available to those skilled in the art and disclosed herein, the presence of free/unreacted and/or residual SA is detectable in commercially available and laboratory-coated samples of stearic acid-treated calcium carbonate. For example, a sample of calcium carbonate having a median particle size ($d_{50}$) of 3 μm was blended with SA in the form of beads supplied by Chemtura Corporation at 1× monolayer concentration (about 0.5% by weight relative to the total weight of the mixture) using a conventional Dry Melt Coating method described herein, which may be representative of conventional processes for treating calcium carbonate with SA. Although the purpose of limiting the amount of SA added to the calcium carbonate at the 1× monolayer coating concentration was to avoid any unreacted/free SA, the latter could not be avoided entirely as shown by testing. For example, as shown in FIG. 1, high-sensitivity differential scanning calorimetry (DSC) detected a minor amount of SA in the Dry Melt Coated calcium carbonate, which shows the melting transition temperature ($T_m$) at about 69° C. that is characteristic of the starting SA. FIG. 2 shows a differential thermogravimetric peak at about 175° C., which is the temperature that corresponds to unreacted/free SA. The presence of starting SA is further evidenced by ToF-SIMS scans shown in FIG. 3, which show a small m/z peak at 285, which is indicative of the presence of stearic acid in the Dry Melt Coated sample. Thus, although SA was added to the sample in the monolayer concentration using the Dry Melt Coating method, detectable amounts of unreacted/free stearic acid are present in the stearic acid-treated calcium carbonate.

The presence of free SA associated with coated calcium carbonate may be undesirable for a number of reasons. For example, residual, unbonded SA in SA-treated calcium carbonate compositions may interfere with downstream processes. Unreacted SA may lead to, for example, smoke generation, undesirable emissions to the environment, and/or extruder die-buildup in polymer processing applications. In addition, product performance may be adversely affected due to surface aesthetics and adhesion. Also, the properties of the plastics containing SA-coated calcium carbonate may be negatively impacted. Thus, for at least the aforementioned reasons, a calcium carbonate composition with low or no free SA may be desirable.

Accordingly, there may be a desire to provide a method of treating calcium carbonate to increase its compatibility with other materials in downstream applications, while reducing or eliminating the amount of residual SA associated with the treated calcium carbonate. The inventors have surprisingly found that a novel aqueous method of coating calcium carbonate under some mixing conditions can reduce or eliminate free SA in SA-treated calcium carbonate compositions, even when SA is added in excess of monolayer concentrations.

Thermal Analysis

For differential scanning calorimetry (DSC), a STARe system from Mettler-Toledo, Inc. equipped with a FRS5 sensor was used. Unless otherwise specified, all samples were run over a temperature range of −70° C. to 200° C. at a heating rate of 20° C./min under a nitrogen purge gas flow of 200 cc/min. A 40 μl capacity, pure aluminum crucible crimped with a pinhole-containing lid was used for all experiments. A heating rate of 20° C./min and a sample size ranging from 60-150 mg was used to improve the detection capability and the accuracy of the quantitative analysis.

Thermogravimetric analysis (TGA) was performed on a METTLER-TOLEDO TGA/DSC 1 model using the MAXRES™ software from room temperature to 600° C., using about a 30 mg sample in an aluminum pan. The minimum and maximum heating rates were 0.25° C./min and 20° C./min, respectively.

Surface Analysis

The Time-of-Flight Secondary Ion Mass Spectrometry (ToF-SIMS) data was acquired on a Physical Electronics (Chanhassen, Minn., USA) Trift III model instrument utilizing a 22 keV $^{197}Au^+$ pulsed primary ion beam. The samples were biased at about +3 kV to extract positive ions generated at the sample by the primary ion beam into the time-of-flight mass spectrometer. The spectra were calibrated using common low mass hydrocarbon fragments such as $CH_3^+$, $C_2H_3^+$, and $C_3H_5^+$. Charge compensation by a low energy electron gun was used to minimize sample charging. The ToF-SIMS sampling depth is generally about 10-20 Å.

Starting Materials

The SA used for coating the calcium carbonate powder was in the form of beads obtained from Chemtura Corporation. Unless otherwise specified, the base calcium carbonate mineral used was a free flowing powder with a median particle size ($d_{50}$) of 3 μm supplied by Imerys, having a surface area of about 3 $m^2/g$ measured via nitrogen BET method. Based on the surface area, it can be calculated that about 0.5% of SA is required to provide a monolayer coverage, based on, for example, a SA footprint of 25 $Å^2$ per molecule. The monolayer stearate coverage was independently verified by solution treatment experiments. Upon exposure to a solution of SA in hexane, the coated sample depletes sufficient acid to completely cover the available surface. TGA analysis of the resultant powder showed that about 0.5-0.6% SA was picked-up, which was in reasonable agreement with the theoretical monolayer coverage. $CaCO_3$ samples with monolayer concentration coating (e.g., "1X" being roughly equal to about 0.5%), as well as excessive coating concentrations (e.g., "6X" being roughly equal to about 3.0%) were prepared and characterized. Commercially available samples of unknown coating conditions were also analyzed.

Dry Melt Coating Method

According to the Dry Melt Coating method, about 2 kg size-lots were prepared by adding $CaCO_3$ to a Papenmeier high speed blender (8 liter capacity) set at the maximum speed and at a temperature of 82° C. A designated amount of SA was then added and allowed to blend for 15 minutes. The treated material was transferred into a tray and allowed to cool. The material was subsequently placed back in the blender and run for 10 minutes without heat as a deagglomeration step.

Wet/Aqueous Coating Method

According to an exemplary Wet/Aqueous Coating method, about 2 kg size-lots were prepared by the Wet/Aqueous method. About ⅓ of the calcium carbonate was added to water in amount sufficient to bring the solids concentration to about 70% by weight. This was followed by the addition of the designated amount of SA, for example, ranging from about 1x to about 6x monolayer, and mixing for 10 minutes at room temperature using the maximum speed of the Papenmeier blender. Then the remaining ⅔ of the calcium carbonate was added, increasing the solids concentration to about 85%. The temperature was raised to 121° C. while mixing until the material appeared dry. The sample was then placed in an oven at 120° C. overnight to assure drying. The material was subsequently placed back in the blender and for 10 minutes without heat as a deagglomeration step.

SUMMARY OF THE DISCLOSURE

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a method for treating calcium carbonate. The method includes combining calcium carbonate with an amount of stearic acid and an amount of water to form a mixture, the amount of water being at least about 0.1% by weight relative to the total weight, and blending the mixture to form a stearic acid-treated calcium carbonate composition.

According to another aspect, a calcium carbonate composition includes calcium carbonate coated with stearic acid, wherein the composition includes less than about 10% free stearic acid relative to a monolayer concentration.

According to yet another aspect, a calcium carbonate composition is produced by a method including combining calcium carbonate with an amount of stearic acid and an amount of water to form a mixture, the amount of water being at least about 0.1% by weight relative to the total weight. The method further includes blending the mixture at a temperature sufficient for a majority of the stearic acid to melt.

According to still a further aspect, a method of making a product including stearic acid-coated calcium carbonate includes combining calcium carbonate with an amount of stearic acid and an amount of water to form a mixture, the amount of water being at least about 0.1% by weight relative to the total weight. The method further includes blending the mixture to form a stearic acid-coated calcium carbonate composition, wherein the mixture is blended at a temperature sufficient for a majority of the stearic acid to melt. The method further includes incorporating the stearic acid-coated calcium carbonate composition into a composition for forming a product.

According to yet a further aspect, a method for treating calcium carbonate includes combining calcium carbonate with an amount of stearic acid and an amount of water to form a mixture, the amount of water being at least about 0.1% by weight relative to the total weight. The method further includes blending the mixture to form a stearic acid-treated calcium carbonate composition, wherein the mixture is blended at a temperature sufficient for at least a portion of the stearic acid to react.

Additional objects and advantages of the disclosure will be set forth in part in the description which follows, and in part will be obvious from the description, or may be learned by practice of the disclosed embodiments.

Aside from the structural and procedural arrangements set forth above, the embodiments could include a number of other arrangements, such as those explained hereinafter. It is to be understood that both the foregoing description and the following description are exemplary only.

DESCRIPTION OF EMBODIMENTS

Reference will now be made in detail to exemplary embodiments of the disclosure, examples of which may be illustrated in the accompanying drawings.

According to some embodiments, calcium carbonate is combined (e.g., blended) at room temperature with SA and water in an amount greater than about 0.1% by weight relative to the total weight of the mixture (e.g., in the form of a cake-mix). For example, according to some embodiments, the mixture may be blended at a temperature sufficient for at least a portion of the stearic acid to react (e.g., sufficient for a majority of the stearic acid to react, for example, with at least a portion of the calcium carbonate). For example, the mixture may be blended at a temperature sufficient such that at least a portion of the stearic acid may coat at least a portion of the calcium carbonate (e.g., the surface of the calcium carbonate).

In some embodiments, the mixture may be blended at a temperature high enough to melt the SA. For example, the mixture may be blended at a temperature ranging from about 65° C. to about 200° C. In other embodiments, the mixture may be blended at a temperature ranging from about 65° C. to about 150° C., for example, at about 120° C. In further embodiments, the mixture may be blended at a temperature ranging from about 65° C. to about 100° C. In still other embodiments, the mixture may be blended at a temperature ranging from about 65° C. to about 90° C. In further embodiments, the mixture may be blended at a temperature ranging from about 70° C. to about 90° C.

In some embodiments, the mixing time may be selected (e.g., optimized) based on the equipment used and/or ambient conditions, such as, temperature, pressure and/or humidity, to allow the SA to react with the calcium carbonate surface (e.g., to allow at least a portion of the SA to coat at least a portion of the surface of the calcium carbonate). For example, in some embodiments, the mixture (e.g., a cake-mix) may be blended for a time period ranging from about 1 second to about 10 minutes. In further embodiments, the mixture may be blended for a time period ranging from about 2 seconds to about 8 minutes. In other embodiments, the mixture may be blended for a time period ranging from about 5 seconds to about 5 minutes. In still further embodiments, the mixture may be blended for a time period ranging from about 10 seconds to about 3 minutes. In further embodiments, the mixture may be blended for a time period ranging from about 10 seconds to about 2 minutes.

The amount of SA may be combined with calcium carbonate at, or in excess of, a monolayer concentration. As used herein, "monolayer concentration" is intended to mean an amount sufficient to form a monolayer on the surface of the calcium carbonate particles. Such values will be readily calculable to one skilled in the art based on, for example, the size of the calcium carbonate particles. For example, a base calcium carbonate with ($d_{50}$) equal to 3 microns has a surface area of about 3 $m^2/g$. With that exemplary surface area, a skilled artisan can calculate that an amount of about 0.5% SA, relative to the total weight of the calcium carbonate, may be theoretically desirable for monolayer coverage.

In some embodiments, SA may be added to calcium carbonate in an amount greater than or equal to about 1× the monolayer concentration. In other embodiments, SA may be added in an amount in excess of about 1× the monolayer concentration, for example, 2× (two times) to 6× (six times) the monolayer concentration.

The calcium carbonate may be characterized by a ($d_{50}$) value, defined as the size at which 50 percent of the calcium carbonate particle concentration includes particles having a diameter less than or equal to the stated value. Particle size measurements such as ($d_{50}$) may be carried out by any means now or hereafter known to those having ordinary skill in the art. In some embodiments, the calcium carbonate may have a ($d_{50}$) less than about 10 microns. In other embodiments, the ($d_{50}$) may be less than about 8 microns. In further embodiments, the ($d_{50}$) may be less than about 6 microns. In still other embodiments, the ($d_{50}$) may be less than about 6 microns. In still further embodiments, the ($d_{50}$) may be less than about 4 microns. In further embodiments, the ($d_{50}$) may be less than about 3 microns. In still other embodiments, the ($d_{50}$) may range from about 0.01 micron to about 3 microns. In other embodiments, the ($d_{50}$) may range from about 0.01 micron to about 2 microns. In still further embodiments, the ($d_{50}$) may range from about 0.05 micron to about 1 micron.

According to some embodiments, the amount of water added to the SA-calcium carbonate combination may be an amount greater than about 0.1% relative to the total weight of the mixture. For example, in some embodiments, water may be added in an amount ranging from about 0.1% to about 20% of the total weight of the mixture. In other embodiments, water may be added in an amount ranging from about 0.3% to about 15%. In still other embodiments, water may be added in an amount ranging from about 0.5% to about 15%. In further embodiments, water may be added in an amount ranging from about 1% to about 15%. In still further embodiments, water may be added in an amount ranging from about 2%, 3%, or 4% to about 15%. In other embodiments, water may be added in an amount ranging from about 5% to about 15%. In still other embodiments, water may be added in an amount ranging from about 6% to about 15%. In further embodiments, water may be added in an amount ranging from about 7% to about 15%. In some embodiments, water may be added in an amount ranging from about 8% to about 15% (e.g., about 8%). In other embodiments, water may be added in an amount ranging from about 9% to about 15%. In still other embodiments, water may be added in an amount ranging from about 10% to about 15%. In yet other embodiments, water may be added in an amount ranging from about 11% to about 15%. In yet further embodiments, water may be added in an amount ranging from about 12% to about 15%. In some embodiments, water may be added in an amount ranging from about 13% to about 15%. The water may be added in various forms, e.g., as a liquid and/or steam, and/or may take the form of a spray and/or mist, for example, as may be produced by an atomizer. In some embodiments, the water also may contain monovalent cations, such as Na, or bivalent cations, such as Ca, Mg, and Zn. Further, the water may be modified to contain Ca cations derived from other sources, such as CaO, Ca(OH)$_2$, or CaCO$_3$. One skilled in the art will appreciate that SA may be introduced at various stages in a given process, including, for example, a water purification stage, when the water content may be relatively high, for example, at least about 20% relative to the total weight of the mixture.

According to some embodiments, the calcium carbonate composition may be hydrophobic. According to some embodiments, the amount of free SA associated with the SA-treated calcium carbonate composition may be less than about 20% relative to the monolayer concentration. According to other embodiments, the amount of free SA associated with the SA-treated calcium carbonate composition may be less than about 15% free SA. According to further embodiments, the amount of free SA associated with the SA-treated calcium carbonate composition may be less than about 10% free SA. According to still other embodiments, the amount of free SA associated with the SA-treated calcium carbonate composition may be less than about 7% free SA. According to still further embodiments, the amount of free SA associated with the SA-treated calcium carbonate composition may be less than about 6% free SA. According to other embodiments, the amount of free SA associated with the SA-treated calcium carbonate composition may be less than about 5% free SA. According to further embodiments, the amount of free SA associated with the SA-treated calcium carbonate composition may be less than about 4% free SA. According to still other embodiments, the amount of free SA associated with the SA-treated calcium carbonate composition may be less than about 3% free SA. In still further embodiments, no free SA may be associated with the SA-treated calcium carbonate composition. As used herein, "no free stearic acid (SA)" is intended to mean no SA detectable by the ToF-SIMS, TGA, and/or DSC techniques described herein.

The SA-treated calcium carbonate composition may be further treated. For example, in some embodiments, the SA-treated calcium carbonate composition may be heated. For example, the SA-treated calcium carbonate composition may be heated or reheated at a temperature ranging from about 120° C. to about 150° C. In some embodiments, the SA-treated calcium carbonate composition may be heated until the sample appears dry.

According to some embodiments, the SA-treated calcium carbonate composition may be blended, for example, to reduce agglomeration. For example, the SA-treated calcium carbonate composition may be blended at room temperature for a time period ranging from about 5 seconds to about 10 minutes.

According to some embodiments, the SA-treated calcium carbonate composition may be used as a filler. For example, the SA-treated calcium carbonate composition may be combined (e.g., blended) with a polymer. In some embodiments, the SA-treated calcium carbonate composition may be combined with a silicone sealant.

EXAMPLES

Example 1

Figure 3:
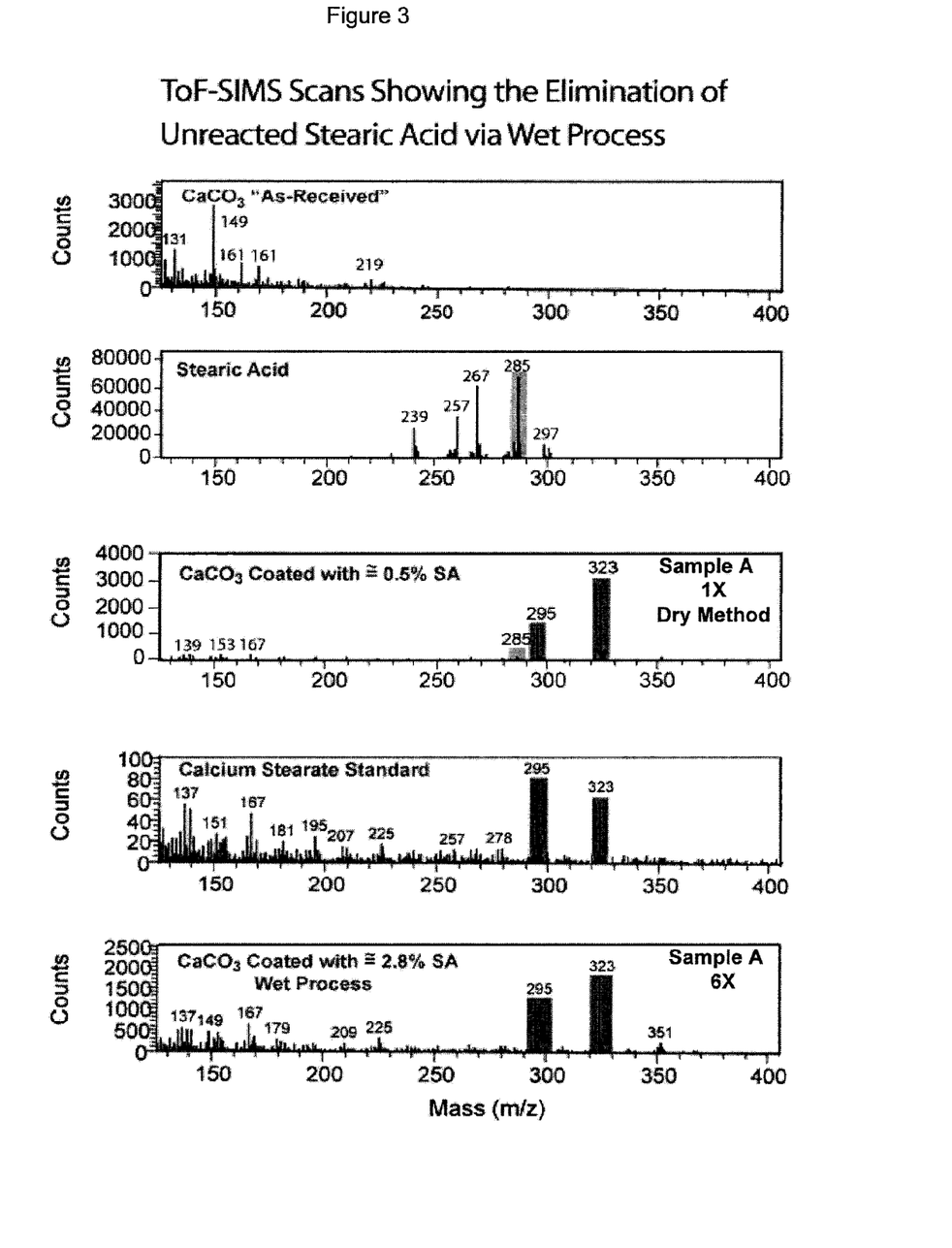
FIG. 3 depicts ToF-SIMS scans showing elimination of unreacted stearic acid via a wet process.

Sample A of calcium carbonate having a median particle size ($d_{50}$) of 3 μm was blended with SA in the form of beads supplied by Chemtura Corporation at 1× monolayer concentration (about 0.5% by weight relative to the total weight of the mixture) as well as 6× (about 2.8% by weight relative to the total weight of the mixture) using an exemplary Wet/Aqueous Coating method described herein. At both concentrations, the starting SA was undetectable. The absence of unreacted/free SA is substantiated by ToF-SIMS scans where the m/z peak at 285, representative of stearic acid, is missing. As may be desirable, no free SA is detectable in the 6×-SA sample prepared in accordance with this exemplary method (FIG. 3; 5$^{th}$ scan), in sharp contrast with the sample prepared with only 1×-SA via the conventional Dry Melt Coating method (FIG. 3; 3$^{rd}$ scan). While not wishing to be bound by theory, it is possible that at least some (e.g., all) excess SA during the exemplary Wet/Aqueous process is converted into calcium stearate ($Ca(St)_2$), which possesses a much higher thermal stability than the starting SA, thereby mitigating, or overcoming, most of the potential problems that might occur during downstream operations sometimes associated with stearic acid-treated calcium carbonate evidencing the presence of unreacted/free stearic acid. It also is possible that Ca cations, in embodiments where the water contains such cations, may react with the SA to form $Ca(St)_2$.

Example 2

Figure 4:
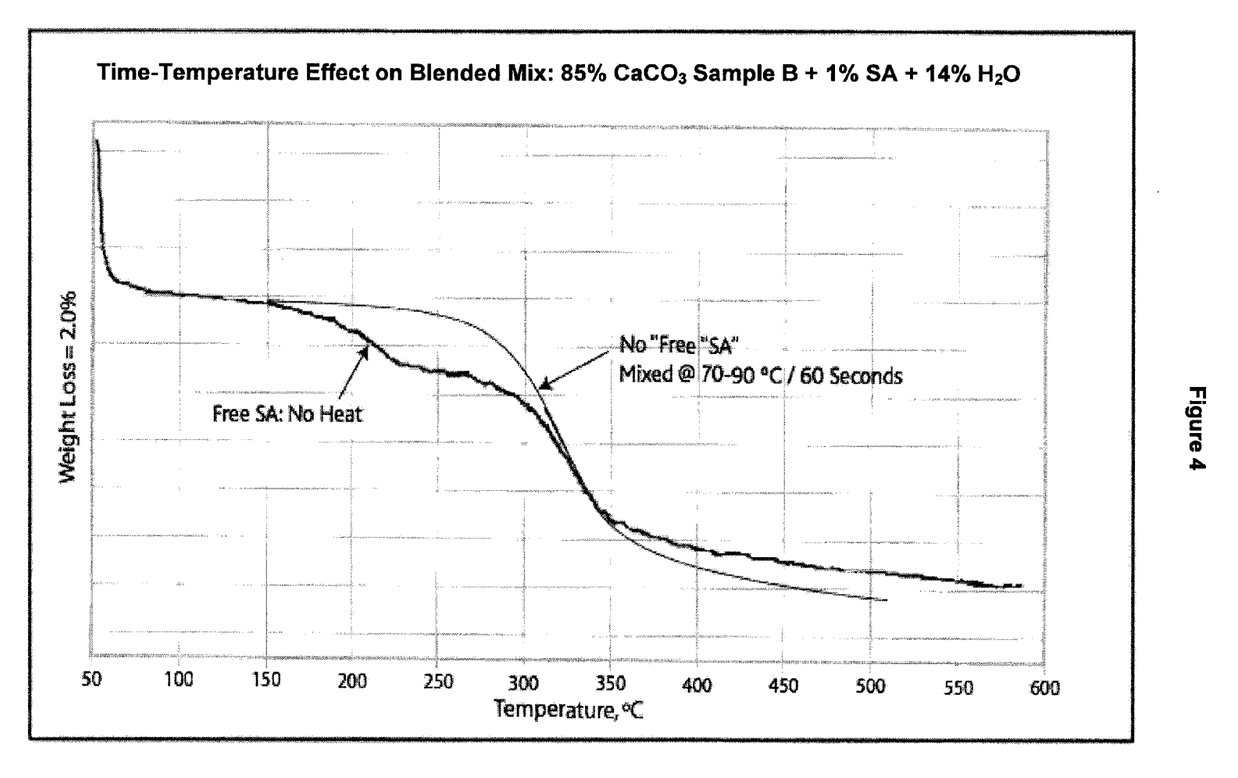
FIG. 4 depicts a time-temperature effect on a blended mix of 85% calcium carbonate, 1% stearic acid, and 14% water.

In this example, a smaller particle size grade of calcium carbonate was chosen with a median particle size ($d_{50}$) of <2 μm ("Sample B"), requiring about 1% of SA by weight for a 1× monolayer coverage. A physical blend of 85% calcium carbonate Sample B+1% SA+14% water by weight, was prepared via high-speed blending at room temperature. This exemplary mixture (e.g., a cake-mix) was then transferred into a blender pre-heated at 100° C. Blending was carried out for 60 seconds. Due to the transfer of the mixture at room temperature, the actual temperature during blending first went down to about 70° C. and reached about 90° C. at the end of 60 seconds blending. FIG. 4 demonstrates the reduction and elimination of free SA associated with the SA-treated calcium carbonate by the exemplary Wet/Aqueous method via absence of the weight loss step centered at about 200° C., typical of starting SA. In FIG. 4, it is believed that the mixture prepared at room temperature should have exhibited all of the 1% SA as unreacted/free SA, but only about 0.3% of unreacted/free SA is observed due to the ongoing reaction during the heating part of the TGA experiment. In contrast, the same mixture pre-heated for about 60 seconds at a temperature in the 70-90° C. range does not exhibit any significant weight loss step at 200° C., which is characteristic of the unreacted/free SA.

Example 3

Figure 5:
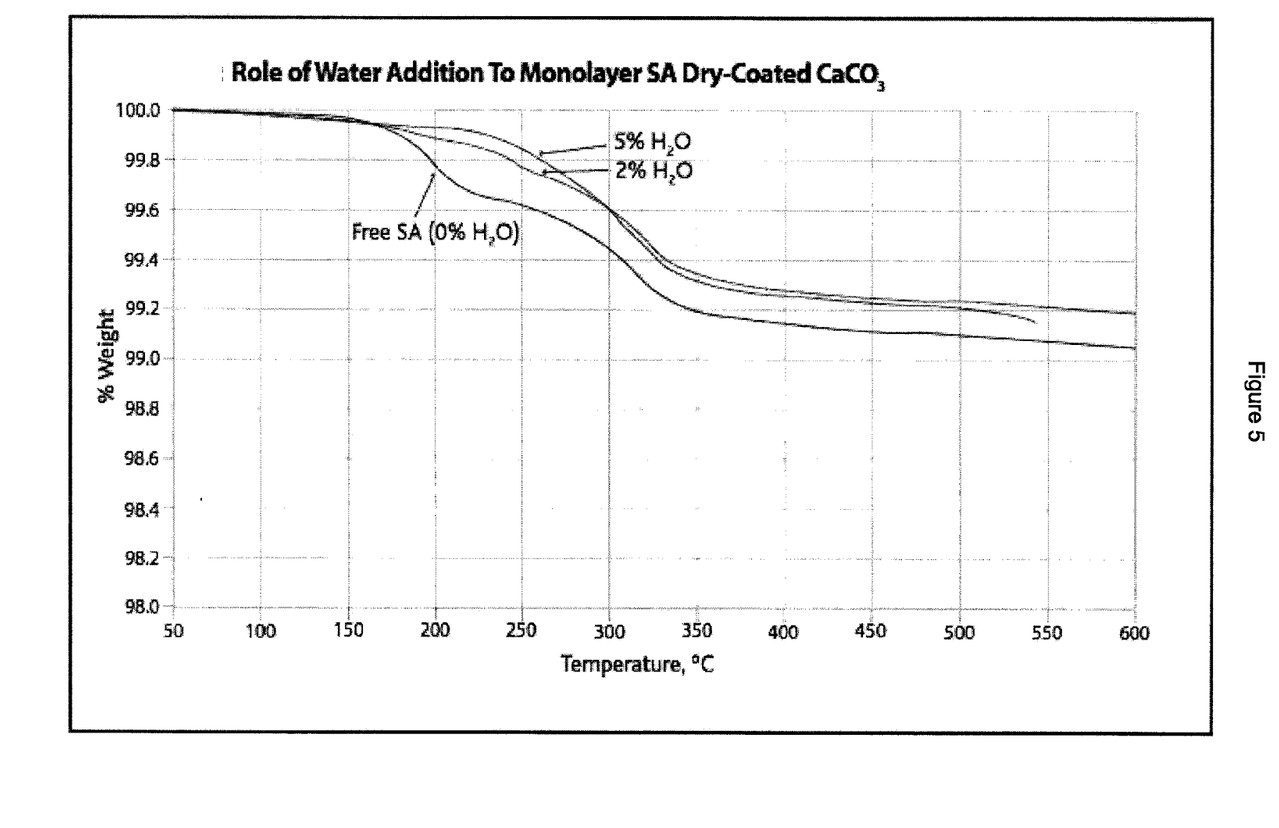
FIG. 5 depicts the role of water addition to monolayer stearic acid dry-coated calcium carbonate.

Physical blends of 94-99% $CaCO_3$ Sample B+1% SA were prepared via high-speed blending at room temperature, with water contents varying from about 0% to about 5%. The exemplary mixture (e.g., a cake-mix) was then transferred into a blender pre-heated at 100° C. Blending was carried out for 60 seconds. FIG. 5 shows a continuous reduction in the amount of unreacted/free SA associated with the SA-treated calcium carbonate composition as the water content increased from 0 to 5%.

Other embodiments of the disclosure will be apparent to those skilled in the art from consideration of the specification and practice of the exemplary embodiments disclosed herein. It is intended that the specification and examples be considered as exemplary only, with a true scope and spirit of the invention being indicated by the following claims.

What is claimed is:

1. A method for treating calcium carbonate, the method comprising:
   combining calcium carbonate with an amount of stearic acid and an amount of water to form a mixture, the amount of water ranging from greater than 1.0% to about 20% by weight relative to the total weight, and wherein the amount of stearic acid is at least about a monolayer concentration; and
   blending the mixture to form a stearic acid-treated calcium carbonate composition.

2. The method of claim 1, wherein the mixture is blended at a temperature of at least about 65° C.

3. The method of claim 1, wherein the mixture is blended at a temperature ranging from at least about 65° C. to about 200° C.

4. The method of claim 1, wherein the mixture is blended for a time period ranging from at least about 1 second to about 10 minutes.

5. The method of claim 1, wherein the mixture is blended for a time period ranging from at least about 2 seconds to about 1 minute.

6. The method of claim 1, wherein the mixture is blended for a time period sufficient for a majority of the stearic acid to react with the calcium carbonate.

7. The method of claim 1, wherein the amount of stearic acid is greater than monolayer concentration.

8. The method of claim 1, wherein the amount of water ranges from at least about 5% to about 15% by weight.

9. The method of claim 1, wherein the amount of free stearic acid associated with the stearic acid-treated calcium carbonate composition is less than about 20% relative to a monolayer concentration.

10. The method of claim 9, wherein no free stearic acid is associated with the stearic acid-treated calcium carbonate composition.

11. The method of claim 1, further comprising combining the stearic acid-treated calcium carbonate composition with a polymer.

12. The method of claim 1, wherein the calcium carbonate has a ($d_{50}$) ranging from about 0.01 μm to about 10 μm.

13. The method of claim 1, wherein the calcium carbonate has a ($d_{50}$) less than or equal to about 3 μm.

14. A method for treating calcium carbonate, the method comprising:
   combining calcium carbonate with an amount of stearic acid and an amount of water to form a mixture, the amount of water ranging from greater than 1.0% to about 20% by weight relative to the total weight, and wherein the amount of stearic acid is at least about a monolayer concentration; and
   blending the mixture to form a stearic acid-treated calcium carbonate composition,
   wherein the mixture is blended at a temperature sufficient for at least a portion of the stearic acid to react with the calcium carbonate.

* * * * *